(12) United States Patent
Parsons

(10) Patent No.: US 7,224,256 B2
(45) Date of Patent: May 29, 2007

(54) STABLE HIGH TEMPERATURE HEATER WITH SERPENTINE HEATING STRANDS ON INSULATIVE SUBSTRATE

(75) Inventor: James D. Parsons, Reno, NV (US)

(73) Assignee: Heetronix, Reno, NV (US)

( * ) Notice: Subject to any disclaimer, the term of this patent is extended or adjusted under 35 U.S.C. 154(b) by 0 days.

(21) Appl. No.: 11/288,490

(22) Filed: Nov. 28, 2005

(65) Prior Publication Data

US 2006/0082433 A1 Apr. 20, 2006

Related U.S. Application Data

(62) Division of application No. 10/608,737, filed on Jun. 27, 2003, now Pat. No. 7,106,167.

(60) Provisional application No. 60/392,381, filed on Jun. 28, 2002.

(51) Int. Cl.
*H01C 3/04* (2006.01)
*H01C 7/02* (2006.01)

(52) U.S. Cl. ........................ 338/25; 338/252; 219/270; 219/528; 219/543

(58) Field of Classification Search ................ 338/25, 338/28, 252; 219/270, 528, 529, 542, 543, 219/544, 505, 553; 73/204.25
See application file for complete search history.

(56) References Cited

U.S. PATENT DOCUMENTS

| | | | |
|---|---|---|---|
| 4,361,597 A | 11/1982 | Arima et al. | 427/555 |
| 4,541,900 A | 9/1985 | Mase et al. | 204/1 T |
| 4,719,441 A | 1/1988 | Horn | 338/20 |
| 4,825,693 A | 5/1989 | Bohrer et al. | 73/204.25 |
| 4,859,835 A | 8/1989 | Balderson | 219/543 |
| 4,916,948 A | 4/1990 | Inada et al. | 73/202.5 |
| 4,972,708 A | 11/1990 | Wiegleb et al. | 73/204.22 |
| 5,155,340 A | 10/1992 | Morita et al. | 219/543 |
| 5,221,639 A | 6/1993 | White | 29/832 |

(Continued)

FOREIGN PATENT DOCUMENTS

JP 63138224 10/1988

OTHER PUBLICATIONS

R. Holanda, "Thin-Film Thermocouples on Ceramics", NASA Technical Briefs, Mar. 1997, p. 62: Pt vs PtRh metal thin films are deposited on AlN dies for use as thin-film thermocouples (TCs).

(Continued)

*Primary Examiner*—Kyung Lee
(74) *Attorney, Agent, or Firm*—Koppel, Patrick, Heybl & Dawson

(57) ABSTRACT

A sensor system has an AlN substrate, a W layer on the substrate, a signal source adapted to apply an electrical actuating signal to the W layer, and a sensor adapted to sense the response of the W layer. The W layer can comprise a thin film, with various types of optional protective layers over the film. Applications include sensing temperature, fluid flow rates, fluid levels, pressure and chemical environments. For a planar heater, the W layer comprises a plurality of conductive strands distributed on the substrate, with the strands generally parallel and serpentine shaped for a rectangular substrate, and extending along respective lines of longitude that merge at opposite poles of the substrate for a circular substrate.

22 Claims, 14 Drawing Sheets

U.S. PATENT DOCUMENTS

| | | | |
|---|---|---|---|
| 5,295,389 A | 3/1994 | Nagata et al. | 73/25.03 |
| 5,610,571 A | 3/1997 | Kuzuoka | 338/22 R |
| 5,997,998 A | 12/1999 | Sawamura | 428/209 |
| 6,084,220 A * | 7/2000 | Suematsu et al. | 219/544 |
| 6,084,221 A | 7/2000 | Natsuhara et al. | 219/553 |
| 6,103,146 A | 8/2000 | Okamoto | 252/514 |
| 6,239,432 B1 | 5/2001 | Parsons | 250/338.1 |
| 6,242,719 B1 | 6/2001 | Kano et al. | 219/444.1 |
| 6,403,037 B1 | 6/2002 | Chang et al. | 422/68.1 |
| 6,450,025 B1 | 9/2002 | Wado et al. | 73/204.76 |
| 6,689,498 B2 | 2/2004 | Shinosawa et al. | 428/698 |
| 2003/0044173 A1* | 3/2003 | Natsuhara et al. | 392/479 |
| 2005/0242081 A1* | 11/2005 | Howick | 219/529 |

OTHER PUBLICATIONS

Y.H. Chiao et al, "Interfacial Bonding in Brazed and Cofired Aluminum Nitride", ISHM '91 Proceedings, pp. 460-468 (The year of publication is sufficiently earlier than the effective filing date and any foreign priority date.).

* cited by examiner

TEMPERATURE RANGE (°C) FOR DIFFERENT OPERATING ENVIRONMENTS

| FIG. # | Air/Oxygen | Ar, He or $N_2$ | $H_2$ | Vacuum |
|---|---|---|---|---|
| 1 | <-196 to ~260 | <-196 to ~1800 | <-196 to ~1800 | <-196 to ~1800 |
| 2 | <-196 to ~1250 | <-196 to ~1800 | <-196 to ~1800 | <-196 to ~1800 |
| 3 | <-196 to ~1000 | <-196 to ~1000 | <-196 to ~1000 | <-196 to ~1000 |
| 4 | <-20 to ~1250 | <-196 to ~1300 | Not Applicable | <-20 to ~1300 |
| 5 | <-20 to ~1250 | <-20 to ~1300 | <-20 to ~1300 | <-20 to ~1300 |
| 6 | <-196 to ~1250 | <-196 to ~1300 | Not Applicable | Not Applicable |
| 8 | <-196 to ~1250 | <-196 to ~1300 | <-196 to ~1300 | <-196 to ~1300 |
| 9 | <-196 to ~1250 | <-196 to ~1300 | <-196 to ~1300 | <-196 to ~1300 |
| 10 | <-196 to ~1250 | <-196 to ~1400 | <-196 to ~1400 | <-196 to ~1400 |

FIG. 24

TEMPERATURE SENSORS

| Characteristic | Best Completed Structure FIG. # | Result | Platinum Thin-Film RTD | Thermistor |
|---|---|---|---|---|
| Max. Zero-Drift Temperature (°C) | | | | |
| • Steady State | 1,2,4,5,6,8,9,10 | >1200 | ~500 | <0 |
| • Thermal Cycling | 1,2,4,5,6,8,9,10 | >1200 | ~400 | <0 |
| Internal Drift Mechanisms (Within Zero-Drift Temp. Range) | | | | |
| • Grain-Growth | 1,2,4,5,6,8,9,10 | No | No | Yes |
| • Densification: | 1,2,4,5,6,8,9,10 | No | No | Yes |
| • Diffusion (Measureable): | 1,2,4,5,6,8,9,10 | No | No | Yes |
| • Expansion Mismatch ($\alpha$): | | | | |
|   ○ Substrate/Circuit | 1 | ≤0.06 | ~0.13 | 0 |
|   ○ Electrode/Circuit | 1 | ~0 | ~0 | >0.3 |
| Maximum Temperature (°C) vs Environments | | | | |
| • Unencapsulated: | | | | |
|   ○ Oxygen | 2,4,5,6,8,9,10 | ~1250 | ~850 | ~300 |
|   ○ Ar, He, N₂ | 1,2 | ~1800 | ~850 | ~300 |
|   ○ Hydrogen | 1,2 | ~1800 | Not Applicable | ~300 |
|   ○ Vacuum | 1,2 | ~1800 | Not Applicable | <300 |
| • Encapsulated | | | | |
|   ○ Oxygen | 1,2,10 | ~1400 | ~850 | ~300 |
|   ○ Ar, He, N₂ | 1,2,10 | ~1400 | ~850 | ~300 |
|   ○ Vacuum | 1,2,10 | ~1400 | | ~300 |
| Precision Limit: (°C) | 1,2 | ±0.0001 | ±0.001 | ±0.01 |
| Response Time (Ratio to Platinum Thin-Film RTD) | 1,2,4,5,6,8,9,10 | ≤0.1 | 1 | >2 |
| Response Type: | 1,2,4,5,6,8,9,10 | ~Linear | ~Linear | Exponential |
| Substrate Thermal Conductivity (W/cm/°K) | 1-6, 8-10 | 2.4 | 0.35 | ≤0.1 |
| Maximum Temperature Range (°C) | 1,2 | <-195 to ~1800 | <-195 to ~850 | <0 to ~800 |

FIG. 25

HEATER STRUCTURES

| Characteristics | Best Completed Structures FIG. # | Property | Bulk | Foil | Rods & Bars | Planar Heaters | Tungsten Wire |
|---|---|---|---|---|---|---|---|
| Source Type | 1-6,8-10 | Plane | Plane | Plane | Line | Plane | Line |
| Heating Modes | | | | | | | |
| · Contact | 1-6,8-10 | Yes | Yes | No | No | Yes | No |
| · Radiative | 1-6,8-10 | Yes | Yes | Yes | Yes | Yes | Yes |
| ΔT(°C)Heater-Object @2"(5cm) | 1-6,8-10 | ~100 | ~100 | ~100 | ~800 | ~100 | >1500 |
| Max.Temp.(°C) vs Environment | | | | | | | |
| · Oxygen | 3 (capped) | ~1800 | ~1300 | ~1000 | ~1000 | ~700 | ~300 |
| · Ar,He,N₂ | 1,2 | ~1800 | ~1300 | ~3000 | ~3000 | ~700 | ~3000 |
| · Vacuum | 1,2 | ~1800 | ~1300 | ~3000 | ~3000 | ~700 | ~3000 |
| · Hydrogen | 1,2 | ~1800 | ~1300 | ~3000 | ~3000 | ~700 | ~1800 |
| Time to Max. Temp. (°C), (Seconds) | 1,2,4,5,6,8,9,10 | | | | | | |
| · Heater | 1,2,4,5,6,8,9,10 | <3 | <60 | <30 | <60 | <60 | <3 |
| · Object@2" (5cm) | 1,2,4,5,6,8,9,10 | <4 | <60 | <120 | <120 | <90 | <10 |
| Radiative Heating Efficiency | 1,2,4,5,6,8,9,10 | Excellent | Very Good | Very Good | Poor | Excellent | Poor |
| Substrate Thermal Conducting (W/cm/°K) | 1-6,8-10 | 2.4 | 2.4 | ~0.1 | N/A | 0.26-2.4 | N/A |

FIG. 26

STABLE HIGH TEMPERATURE HEATER WITH SERPENTINE HEATING STRANDS ON INSULATIVE SUBSTRATE

RELATED APPLICATIONS

This application is a divisional of Ser. No. 10/608,737, filed Jun. 27, 2003, now U.S. Pat. No. 7,106,167 which claims the benefit of provisional application Ser. No. 60/392,381, filed Jun. 28, 2002 by the present inventor.

BACKGROUND OF THE INVENTION

1. Field of the Invention

This invention relates to sensing systems suitable for high temperature applications, and more particularly to the use of tungsten on an AlN substrate as a sensing and/or heating element.

2. Description of the Related Art

Improvements are continually sought in the capabilities of various types of sensing and planar heating systems, such as systems for sensing temperature, fluid flow rates and levels, pressure and gaseous environments, self-sensing planar heaters and fast, uniform heaters. The characteristics sought to be enhanced include faster response time, greater sensitivity, higher temperature capability and low drift.

Temperature Measurements

Devices employed as temperature sensors are generally segmented into 6 categories: (1) Integrated-Circuits (ICs); (2) Pyrometers; (3) Resistance Temperature Detectors (RTDs); (4) Thermistors; (5) Thermocouples (TCs); (6) Electro-Mechanical & Volume (EMV). ICs include transistors, bolometers and pyroelectrics. Pyrometers, sensitive to infrared, optical and acoustic wavelengths, convert the input wavelength to an optical or electronic output by means of an IC, RTD, thermistor or TC. RTDs include all metals in the form of wire, thin/thick-films on $Al_2O_3$, and foil, in which the change in metal resistance vs temperature produces a change in voltage drop, under constant current bias. Thermistors include hot-pressed and/or fired ceramics (usually oxides), with embedded electrical contact wires; the principle of operation is identical to that of RTDs. TCs include metals, in the form of wires or thin-films, in which the junction formed between 2 dissimilar metals generates a temperature dependent voltage. TCs do not require electrical input to the TC junction (e.g., current), but they do require an electrical input to maintain a reference junction. EMVs include devices such as metal coils and strips, and volumetric tube and bulb thermometers, in which expansion/contraction of the metal/fluid is used to measure temperature.

Flow Rate and Fluid Levels

Precision flow rate monitoring and control of gases is accomplished by temperature sensors (usually RTDs) in devices known as mass flow controllers. In these devices, part of the total gas flow is fed around the main flow path. As the gas passes through this alternate path, it is heated. Each gas has a known and unique heat capacity, at constant pressure. Thus, the difference in temperatures, between 2 to 4 temperature sensors positioned in series along the alternate flow path, can be used to measure and control the gas flow rate through the device. Applications encompass all processes requiring precise control, e.g., semiconductor chip manufacturing.

For a single flow sensor or a fluid level sensor, the heat capacity of the surrounding environment depends on its composition, state (gas or liquid), density and the rate at which it flows past the sensor. A self-heated temperature sensor, located at a known level in a tank, indicates whether the tank is filled below or above the sensor location, or the flow rate of a gas/liquid past it.

Pressure Sensors

The most commonly employed pressure sensor relevant to the present invention is the thermocouple (TC) gauge. TC gauges are used to measure pressures between atmospheric and 0.0001 torr in vacuum systems. However, their sensitivity to surface temperature change, resulting from pressure change, as well as their high temperature capabilities, is limited.

Planar Heaters

Planar heaters are capable of providing uniform and efficient heating over the entire area of a substrate, except at the substrate edges, and they require only a single bias control. There are 2 types of planar heating technologies: bulk and thin/thick film.

Bulk heaters are ceramic materials (e.g., graphite, SiC, and BN), which provide the electrical conduction path and act as the planar heater. SiC and BN are electrical insulators at room temperature, and must be heated by high voltage/low current to a temperature at which they become electrically conductive. They then require low voltage/high current for further heating. Bulk heaters require cables or post electrical contacts, because the cross-section of the electrical leads must be greater than the heater cross-section between leads, or the lead-wires will be hotter than the heater. They are slow and difficult to control.

Thin/thick film planar heaters heat a substrate by resistive power dissipation through a thin/thick film conductive circuit on the substrate. This type of heating has been limited to low temperature (~700° C.) convective heating, because of circuit/substrate materials, circuit designs and lead-wire bonding limitations. The circuit substrate materials have not been matched to avoid reactions between them, or peeling of the circuit materials. Existing circuit designs can lead to thermal gradients, which cause the substrate to crack when the heater is ramped too fast. Finally, materials that have been used in electrodes are not stable above about 700° C.

Uniform, high temperature, radiative heating has been accomplished by using an array of tungsten-wire filament, halogen lamps. Such arrays are used in rapid thermal process (RTP) furnaces to heat semiconductor wafers from room temperature to 1100° C. in a few seconds. In RTP furnaces, as many as 300 such lamps may be arrayed. The power of each lamp must be monitored and adjusted to maintain a uniform temperature distribution across the wafers. Control of this type of technology is complicated and expensive.

Prior art directly related to the present invention includes:

R. Holanda, "Thin-Film Thermocouples on Ceramics", NASA Technical Briefs, March 1997, p. 62: Pt vs PtRh metal thin films are deposited on AlN dies for use as thin-film thermocouples (TCs). The drift of the TC junction vs temperature (to 1500° C.) is discussed.

Y. H. Chiao et al., "Interfacial Bonding in Brazed and Cofired Aluminum Nitride", ISHM '91 Proceedings, pp. 460-468: The reactions for joining interfaces between AlN and several metals, including W, is discussed and compared with the joining method (braising or cofiring). A multilayer AlN/W structure is disclosed, in which the interface joining is due to interlocking grain-boundaries. Although not disclosed in the article, such a structure has been used as a heater, but without any mechanism for sensing the actual temperature.

U.S. Pat. No. 6,084,221: Silver and silver alloys on AlN are discussed for planar heater applications.

U.S. Pat. No. 6,103,146: Thick film, screen-printable circuits, comprised of conductive paste compositions which facilitate the application of Au, At, Pt, Pd and Rh mixtures and alloys, are applied directly to AlN substrate surfaces.

U.S. Pat. No. 6,242,719: Thick films are described as being deposited on AlN by chemical vapor desposition.

U.S. Pat. No. 6,239,432, issued May 29, 2001 in the name of the present inventor: An IR absorbing body of SiC is electrically and mechanically connected to an AlN substrate by an electrically conductive mounting layer that includes W, WC or $W_2C$.

SUMMARY OF THE INVENTION

The present invention seeks to provide a new sensor system and method that is capable of achieving a faster response time, greater sensitivity, higher temperature capability and lower drift than previous sensor systems.

In a preferred embodiment, a thin film layer of tungsten is provided on an AlN substrate, with a signal source applying an electrical actuating signal to the tungsten layer, and a sensor sensing the response of the tungsten layer to the actuating signal. Various oxidation-resistant protective layers can be provided over the tungsten layer, including gold, $B_2O_3$—$SiO_2$, Au—Pt alloys (with an optional tungsten or $B_2O_3$—$SiO_2$ layer over the alloy), or Pt (with an optional $B_2O_3$—$SiO_2$ layer over the Pt). An AlN cap can also be provided over the protective layer.

The tungsten layer in a preferred embodiment comprises a plurality of conductive strands distributed on a planar AlN substrate. For substrate shapes such as rectangular, the strands are preferably serpentine shaped and parallel. For a circular substrate, the strands preferably extend along respective lines of longitude that merge at opposite poles of the substrate.

While tungsten on an AlN substrate is preferred, the invention can be generalized to the use of an AlN substrate and a conductive layer on the substrate which, over a predetermined temperature operating range, has an expansion coefficient within 1.00+/−0.07 of the substrate, is substantially non-reactive with the substrate, and exhibits substantially no solid-solubility or inter-diffusivity with the substrate. It can also be generalized to the use of an insulative substrate, with a tungsten conductive layer on the substrate which, over a predetermined temperature operating range, has an expansion coefficient within 1.00+/−0.07 of the substrate, is substantially non-reactive with the substrate, and exhibits substantially no solid-solubility or interdiffusivity with the substrate.

Applications for the described material system include planar heaters capable of self-sensing their own temperature; fluid flow rate sensors using only a single W/AlN element, or a pair of such elements spaced apart in the fluid flow path with one heated, the other not heated, and both sensing the fluid temperature at their respective locations; fluid level sensors capable of sensing whether or not they are immersed in a predetermined fluid; pressure sensors in which the voltage/current relationship of the sensor is related to the surrounding gas pressure; and chemical sensors for environments in which the tungsten layer is subject to an alteration from the environment which changes its response characteristics.

These and other features and advantages of the invention will be apparent to those skilled in the art from the following detailed description, taken together with the accompanying drawings.

BRIEF DESCRIPTION OF THE DRAWINGS

FIGS. 24, 25 and 26 are tables summarizing the temperature range of various embodiments of the invention for different operating environments, characteristics of temperature sensors using various embodiments of the invention compared to prior art temperature sensors, and characteristics of heaters using various embodiments of the invention compared to prior art heaters, respectively.

DETAILED DESCRIPTION OF THE INVENTION

Figure 1:
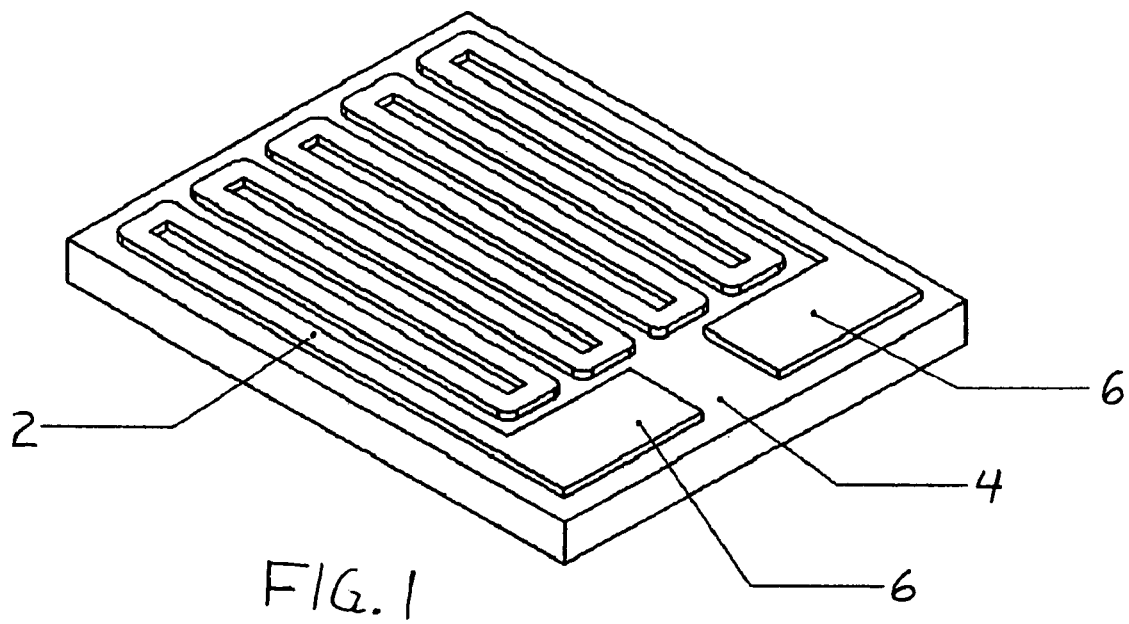
FIG. 1 is a perspective view of a sensor/heater in accordance with one embodiment of the invention, with a thin film tungsten layer on a AlN substrate.

The present invention provides a novel system and method for sensing temperature, fluid flow rates, pressure and chemical environmental conditions, as well as functioning as a heater capable of sensing its own temperature, with a higher temperature capability, greater sensitivity, faster response time and/or lower drift than previous sensors. In the preferred embodiment, it is based upon a tungsten (W)

thin film sensor layer formed on an AlN substrate (a thin film is generally defined as having a thickness of about 100-10,000 angstroms). This combination of materials is particularly advantageous because AlN has a thermal expansion coefficient of approximately $4.4\times10^{-6}/°$ K at 330° and $5.3\times10^{-6}/°$ K at 1273° K, while the thermal expansion coefficient for tungsten is approximately $4.6\times10^{-6}/°$ K at 300° K and $5.1\times10^{-6}/°$ K at 1273° K. The thermal expansion coefficients for the two materials are thus very close to each other, allowing for a high degree of structural stability over a broad temperature range. The AlN substrate is insulative, while tungsten is generally conductive with a resistivity that varies in a known fashion with temperature. The temperature-resistivity characteristics of tungsten are discussed in American Institute of Physics Handbook, 3d Ed., 1982 Reissue, pp. 9-41, the contents of which are incorporated herein by reference.

While W/AlN is the preferred material combination, the material system can be generalized to an AlN substrate with a conductive layer on the substrate, or an insulative substrate with a tungsten layer on the substrate, with the conductive layer in either case having an expansion coefficient within 1.00+/−0.07 of the substrate over a predetermined temperature operating range, being substantially non-active with the substrate, and exhibiting substantially no solid-solubility or interdiffusivity with the substrate.

AlN has a thermal conductivity of approximately 1.7-2.4 W/cm° K, about 10 times higher than ceramic $Al_2O_3$, making it very effective as a heater when it is itself heated by an adjacent tungsten layer. It also exhibits a desirably high resistance to chemical reaction with metals such as tungsten. It sublimates at approximately 2500° C. and has an upper continuous use temperature from approximately 1150° C. to 1800° C., depending upon its environment, making it useful for high temperature ranges. Tungsten has a melting temperature of approximately 3410° C. and is not known to chemically react with AlN below about 1800° C., which also makes it advantageous for high temperature operations in combination with AlN.

The complete lack, or immeasurably slow, chemical reaction, solid-solubility and interdiffusivity between tungsten and AlN at temperatures to approximately 1880° C. in inert environments ensures that the tungsten circuit's cross-section does not decrease due to chemical reaction with the AlN substrate, and that the AlN substrate surface does not become electrically conductive. The provision of an AlN substrate surface with crevasses which provide a means for attaching the tungsten circuit, and the closely matched temperature expansion coefficient over the operating temperature range, ensure that the tungsten circuit does not peel away from the AlN substrate surface during thermal cycling.

As described in further detail below, additional circuit layers consisting of Au, Pt or Au—Pt alloys may be provided on the tungsten circuit layer to perform three functions: (1) protect the tungsten circuit from oxidation; (2) bond the circuits on AlN substrates and caps together to form a multilayer circuit with electrically insulating AlN surfaces exposed on the top and bottom; (3) provide additional cross-sectional area to the circuit path.

Compatibility requirements between such additional circuit layers and tungsten (or WC, when carbon is reacted with the tungsten to provide a bonding agent for another layer) include: (1) little or no chemical reaction between them, up to the maximum operating temperature; (2) they bond with limited interdiffusion and limited solid-solubility, thus remaining distinct at and near the opposite facing interfaces; (3) the maximum solid-soluability between them is limited so that they do not form an isomorphic or pseudo-isomorphic phase diagram, up to the maximum operating temperature; (4) they do not form compounds with each other; and (5) their melting temperatures exceed the maximum operating temperature. Requirements 1-4 ensure that the additional circuit layers do not poison their interface with the tungsten (or WC), and that the combined circuit resistance does not drift under operational conditions.

As also described in further detail below, some embodiments include an encapulation of a borosilicate mixture $(B_2O_3+SiO_2)$. The borosilicate mixture is applied in unreacted form, and then reacted by heating the structure to at least 1000° C. The reacted mixture is a glass that is bonded to surfaces that can be oxidized, and covers layers that cannot be oxidized. It does not consume the circuit layers with which it is in contact, and remains an electrical insulator.

Electrodes for applying electrical signals to the tungsten circuit layer can be formed from extended area portions of the circuit layer itself, by additional circuit material applied or deposited on and around the edges of an AlN substrate or cap, or by additional circuit material applied or deposited within vias in the substrate or cap.

Additional electrode layers can be provided on top of the tungsten electrode for lead wire or ribbon attachment. Such additional layers can include carbon, platinum or gold. Carbon provides a thermally activated bonding material that bonds W to W or W to Mo when heated above about 700° C., at which carbon is consumed by reacting with W and Mo to form a metal-carbide bonding interface which remains intact at temperatures greater than 1800° C. Platinum provides a base upon which Pt or Au can be welded; the bond will remain intact at temperatures equal to the melting point of Pt or the Au—Pt alloy formed during welding. Gold provides a base upon which to bond Au or to weld Pt; the bond will remain intact at temperatures equal to the melting point of Au or the Au—Pt alloy formed during welding.

The additional electrode layers can also include layered Pt and Au, or Au—Pt alloy. This provides a base upon which to bond Au or weld Pt.

The thickness of the electrode materials which participate in the braising, bonding or welding process should be at least 0.05 times the diameter of the lead wire or the thickness of the lead ribbon. The electrodes can be exposed, encapsulated, or covered by AlN.

Process Considerations

AlN-Substrate or Cap Surface in Contact with W: W films hold themselves to the AlN surface by electrostatic forces and by penetrating into crevasses in the AlN surface. Though difficult to quantify, observed results indicate that good W adhesion is obtained on all ceramic AlN surfaces (roughness average $\geqq 2$ micro-inches (0.05 µms)). However, the maximum thickness of the W is directly proportional to the AlN surface roughness average. The maximum thickness of W on an AlN surface is about 100 times the surface roughness average.

Application to and 'Forming' on AlN substrate and Cap: W can be applied with the correct stociometry to an AlN surface by several vapor-phase deposition techniques, such as RF/DC sputtering, RF/DC co-sputtering, e-beam evaporation and chemical-vapor-deposition (CVD). The temperature of the AlN surface during W deposition is not important, since adhesion occurs by physical-bonding, and not by chemical-bonding.

As deposited, W films will not be of theorectical density unless deposited by CVD. Film density can be increased, and grain-boundary area reduced, by thermal annealing.

When density or grain-boundary area are important for protecting the W/AlN interface from additional circuit layer metals, the W should be annealed before application of additional circuit layer metals. The annealing temperature range is 800° C. to 1400° C., with density and grain-growth depending on time-at-temperature. The annealing atmosphere should be vacuum or inert (Ar, $N_2$).

Tungsten films can be partially or completely converted to WC, when desired to facilitate the bonding of an upper layer, by "forming". In this process, carbon is applied to as-deposited (preferred) or annealed W films by sputtering, physical vapor deposition or CVD, or physical application of graphite (e.g., screen-printing). The W film is transformed to WC by thermally induced diffusion ("forming"). The forming temperature range is 800° C. to 1400° C., with the higher temperature preferred. The 'forming' atmosphere should be vacuum or inert (Ar, $N_2$). For purposes of this invention, references in the claims to "W" also include "WC", although WC has been found to have a lower thermal coefficient of expansion than W and therefore is not as desirable as W, except to bond an overlayer in place.

The minimum preferred as-deposited W thickness is equal to the roughness average of the AlN surface, if W is to be covered by additional circuit layer metal layers. If W is to be the only film comprising the current path, its minimum thickness is determined by the greater of the following two requirements: (1) the post-processing thickness of the W should be at least 2 times the roughness average of the AlN surface, or (2) its thickness times its width (cross-sectional area) should be sufficient to provide the current handling capability required by the sensor or heater. While there is no fundamental limitation on maximum W thickness, low-mass radiation heater or circuit applications do not generally require a thickness greater than 10 microns.

Additional Circuit Layer (ACL) Metals: The as-applied/deposited ACLs can be comprised of one or more-layers, each applied/deposited sequentially. Each layer of the ACL can be applied by painting, screen-printing, electroplating, or vapor deposition (technique depends on material).

The processed ACL can be a single or multilayer film comprised of element(s) or alloy(s), or graded compositions of both. The processed ACL can be as-applied/deposited, or it can be thermally processed to redistribute film composition. Melting can occur in one or more (but not all) layers of the ACL during thermal processing, but the resulting alloys must be solids at the same processing temperature. For example, Au—Pt alloys can be formed by heating an Au/Pt multilayer structure to a temperature in excess of the melting temperature of Au, but below the melting temperature of the desired alloy. In this case only the Au melts, whereupon it is quickly consumed by the Pt to form an alloy with a higher melting temperature.

The thickness of the as-applied/deposited ACL metal(s) should be such that the post-processing thickness of the ACL is equal to or greater than the AlN surface roughness average. The minimum preferred as-deposited thickness of the ACL is $5 \times 10^{-6}$ cm. The minimum thickness of the ACL may be determined by the requirement that the W+the ACL cross-sectional area be sufficient to provide the current handling capability required by the sensor or heater. The maximum thickness of the ACL is limited by the strain it imparts to the circuit, relative to the AlN, by the expansion coefficient difference between the W and the ACL. Experimental investigations performed to date show the upper thickness limit to be greater than 60 times the W thickness.

Carbon Reaction Bonding: Carbon provides a thermally activated bonding material, which bonds W/Mo wire/ribbon to W electrodes when heated above about 700° C., with C consumed by reacting with W and Mo to form a WC or Mo-carbide bonding interface between W and W, or W and Mo; the bond will remain intact at temperatures exceeding 1800° C. The thickness of electrode materials which participate in the reaction bonding process should be sufficient to consume all of the C. The bonding process requires that C, W and Mo inter-diffuse, so that the rate at which bonding proceeds to completion is directly proportional to temperature. The thickness of the electrode materials which participate in brazing, bonding or welding process should be at least 0.05 times the diameter of the wire, or 0.05 times the thickness of the ribbon or flattened wire. This is a minimum thickness requirement for a functional bond, as determined from experimental investigation. However, at this ratio strong bonding is difficult to achieve (low yield). An electrode thickness of at least 0.1 times the wire diameter or at least 0.1 times ribbon thickness is recommended, because yield is higher and the ruggedness of the bond is improved.

Au and Pt Alloy Bonding: A Pt electrode layer provides a base upon which to weld Pt or weld/bond/braze Au wire/ribbon; the bond formed between the wire/ribbon and the electrode will remain intact at temperatures equal to the melting point of Pt or of the Au—Pt alloy formed during the bonding process. An Au electrode layer, layered Pt and Au electrode layers, and Au—Pt alloy electrode layers each provide a base upon which to weld/bond Au wire/ribbon, or to weld/braze Pt wire/ribbon; the bond formed between the wire/ribbon and the electrode will remain intact at temperatures equal to the melting point of Au, or of the Au—Pt alloy formed during the bonding process. The thickness of the electrode materials which participate in the brazing, bonding or welding process is similar to carbon reaction bonding.

The lead-wires/ribbons should be attached to the electrode pads by bonding, brazing or welding. The expansion coefficient of the lead wire material should be within 2 times that of the composite expansion coefficient of the post-process electrode layers. The portion of the lead-wires to be bonded/welded/brazed to the electrodes may be flattened, in which case the lead-wire diameter perpendicular to its flattened surface is the appropriate diameter to use in determining the minimum thickness of electrode layers.

FIG. 1 illustrates a sensor in accordance with the invention in which a thin film of tungsten 2 is deposited on an AlN substrate 4, preferably in a generally serpentine fashion, with the opposite ends of the tungsten circuit layer expanded in area to form electrodes 6. This structure can serve as a sensor and/or heater for the various applications discussed below.

Structures as illustrated in FIG. 1 were fabricated by dicing AlN ceramic sheets to 2 in.×2 in. (5 cm×5 cm) square AlN substrates and cleaning them. 5000 angstroms of tungsten were sputter deposited on one side of the substrates, and the circuit 2 and electrodes 6 photomasked. The exposed tungsten was removed at room temperature by a 3% $H_2O_2$+ $A_2O$ solution. The photoresist was then removed and the resulting circuit structures cleaned.

To attach lead wires to the electrodes 6, the structure was photomasked to expose the electrodes, and Pt was sputter deposited on the exposed electrodes. In one version, in which screen printed Pt was added, the sputter deposited Pt should be at least 0.5 microns thick to provide a base for the additional screen printed Pt. A layer of Pt approximately 10 microns thick was thin screen printed on the electrode array, the Pt ink air dried for at least one hour, followed by vacuum drying for 15 minutes, air drying at approximately 150° C. for 30 minutes, and then baking in Ar at 1100° C. for one hour. With no added screen printed Pt, the sputter deposited Pt should be at least 2 microns thick for a flattened lead wire, and annealed in Ar at 1100° C. for 30 minutes.

With or without the added screen printed Pt, a thin glass plate was waxed down onto the circuit side of the AlN substrate, which was then diced into individual sensors and the wax and glass removed. Pt lead wires were next welded to the electrodes. Without the additional screen printed Pt, the ends of 10 mil diameter Pt lead wires were flattened to approximately 1 mil and welded to the electrodes. With the additional screen printed Pt, the lead wires were welded to the electrodes without flattening.

Figure 2:
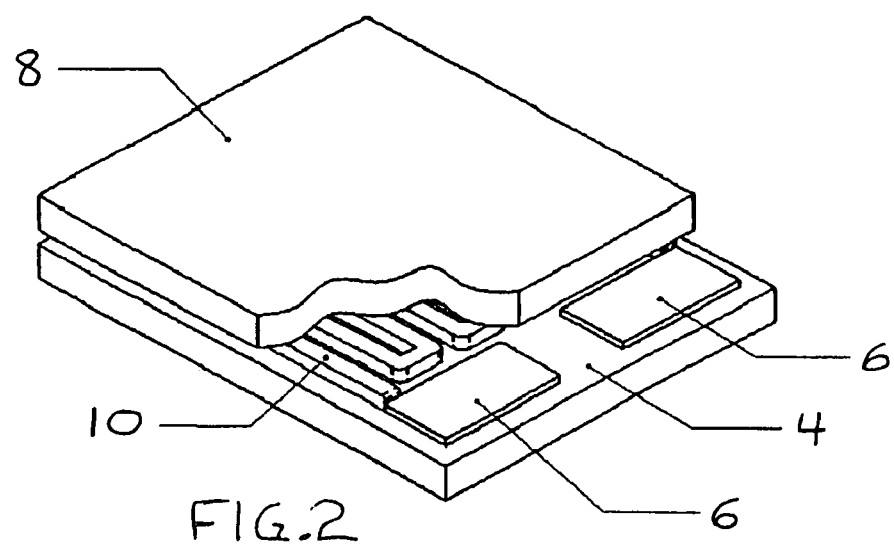
FIG. 2 is a cut-away perspective view of another embodiment, with a AlN substrate and cap bonded together by a WC layer.

FIG. 2 illustrates another embodiment in which a protective AlN cap 8 is secured by applying a thin film carbon layer (not shown separately) over the tungsten layer 2 of FIG. 1, applying a thin film tungsten layer (not shown separately) with a geometry that matches tungsten layer 2 to the underside of cap 8, placing the cap 8 over the substrate 4 with their respective tungsten and carbon aligned, and thermally reacting the assembly to form a final circuit comprising a WC layer 10 sandwiched between, and adhering together, the substrate 4 and cap 8.

In a demonstration of this embodiment, 1000 angstroms of tungsten was sputter deposited on both the substrate 4 and the cap 8, with 17200 angstroms of carbon deposited onto the substrate tungsten through a shadow mask.

Figure 3:
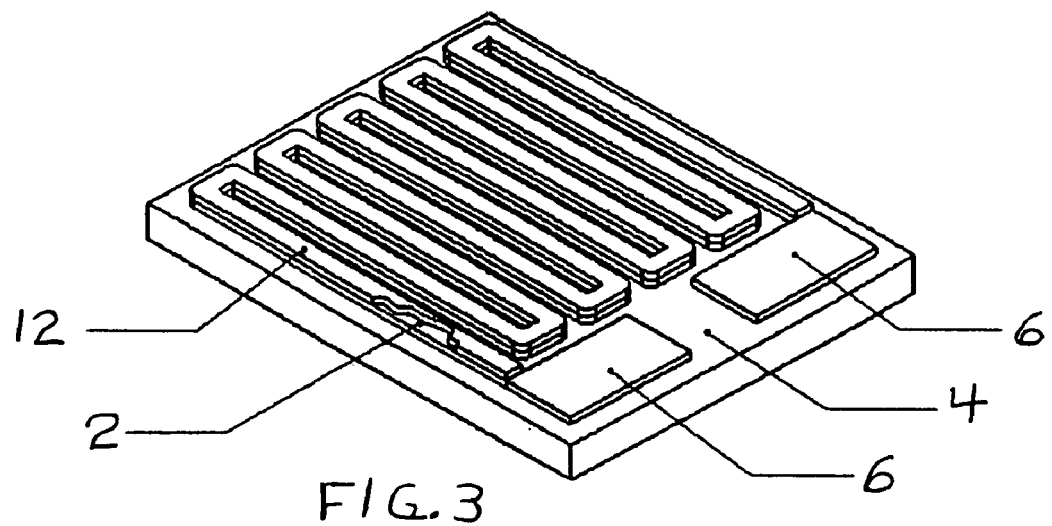
FIG. 3 is a perspective view of another embodiment, with a protective layer on the tungsten layer of FIG. 1.

Another variation is illustrated in FIG. 3. In this embodiment a thin film of gold 12 is applied over the tungsten layer 2 of FIG. 1 to protect it from oxidation, and also for physical protection.

In a demonstration of this embodiment, a 1000 angstrom film of tungsten was sputter deposited onto one side of the AlN substrate and annealed in Ar at 1100° C. for 30 minutes. A photomask was applied to expose the tungsten circuit 2 and electrodes 6, 500 angstroms of gold was sputter deposited onto the masked side of the substrate, the photoresist was lifted off and the remaining structure cleaned. Any tungsten not protected by the gold layer was removed in a 3% $H_2O_2+H_2O$ solution at room temperature. The device was then photomasked to expose the electrodes 6, and 4 microns of gold electroplated onto the exposed electrodes, followed by lifting off the photoresist and cleaning. The final step prior to dicing into individual sensors and bonding lead wires was an anneal in Ar at 700° C. for 30 minutes.

In another demonstration, at least 200 angstroms of Pt instead of Au was sputter deposited onto the tungsten circuit layer 2 and annealed in Ar at 1000° C. for 15 minutes. A further demonstration encapsulated the resulting structure in a thermally reacted borosilicate mixture.

Figure 4:
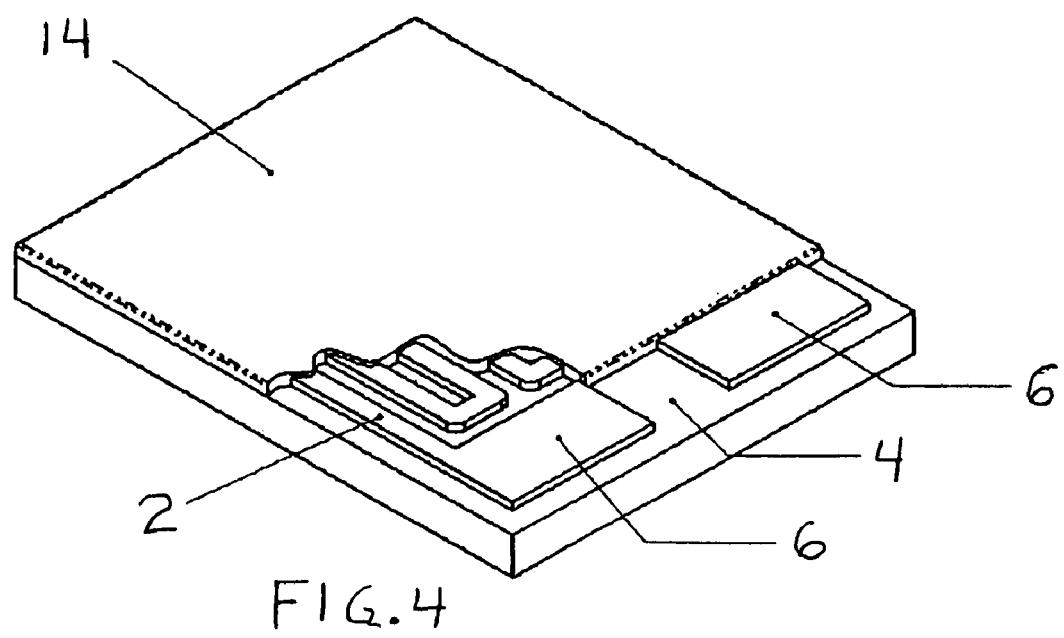
FIG. 4 is a cut-away perspective view of another embodiment, with a protective encapsulation over the structure of FIG. 1.

In the embodiment of FIG. 4, unreacted $B_2O_3+SiO_2$ has been applied over the tungsten circuit 2 and substrate 4 of FIG. 1, and thermally reacted to form an encapsulation 14 that protects the underlying structure and further bonds the tungsten circuit to the substrate.

The borosilicate mixture consisted of 45 wt % $B_2O_3$+55 wt % $SiO_2$. It was reacted in air at 1000° C. for 5 minutes.

Figure 5:
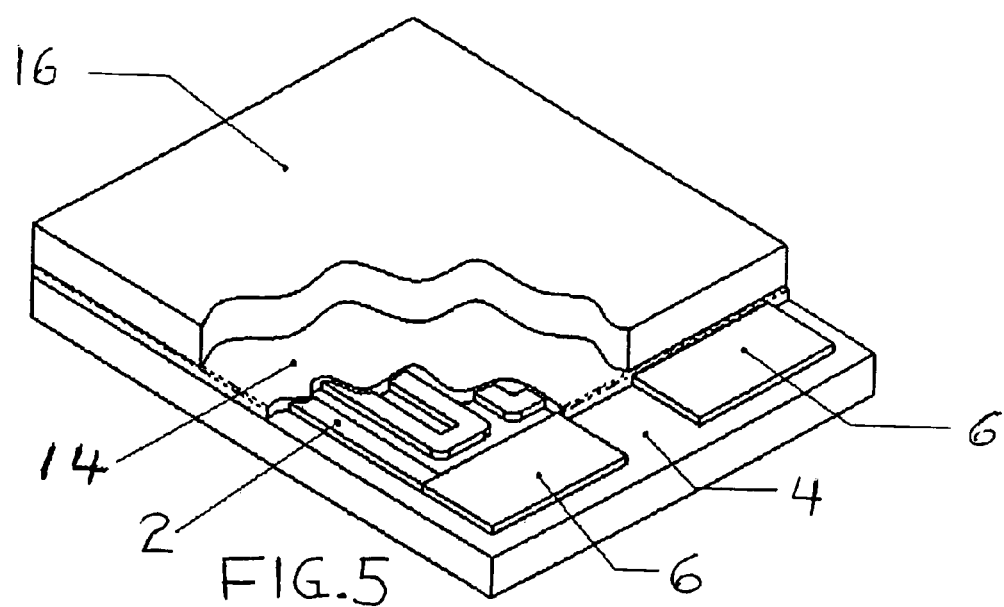
FIG. 5 is a cut-away perspective view of another embodiment, with an AlN cap over the structure of FIG. 4.

In the embodiment shown in FIG. 5, an AlN cap 16 has been placed on top of the unreacted $B_2O_3+SiO_2$ 14 of FIG. 4, and the resulting structure thermally reacted to bond the AlN cap 16 in place for additional protection. Both the encapsulation 14 and the cap 16 leaves the electrode pads 6 exposed to receive lead wires or ribbons used to apply an electrical signal to the tungsten circuit. The borosilicate was reacted in air at 1000° C. for 5 minutes to bond the cap in place.

Figure 6:
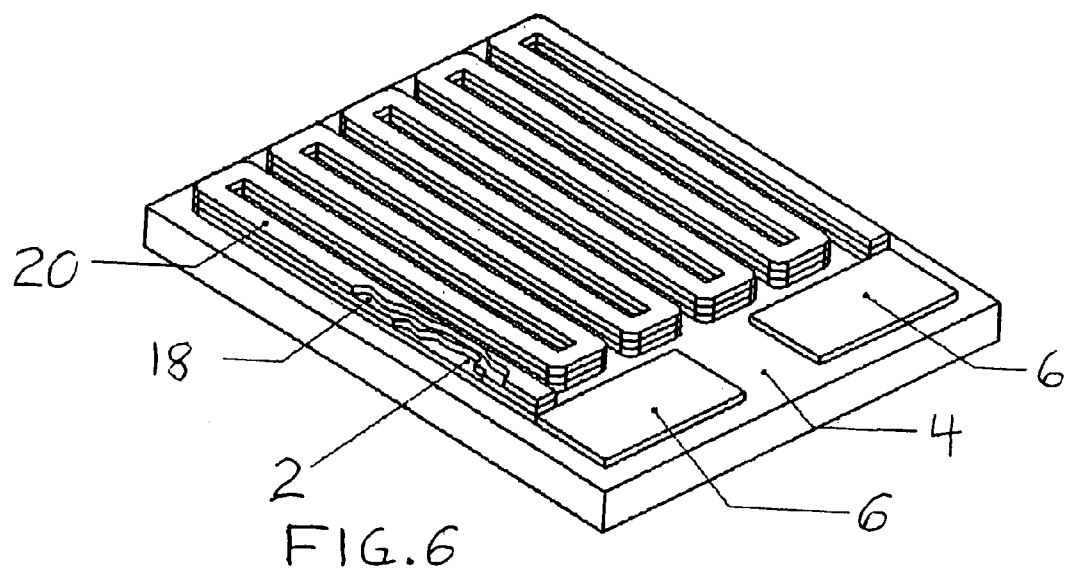
FIG. 6 is a perspective view of a precursor to another embodiment, in which an Au—Pt alloy provides a protective cap to the structure shown in FIG. 1.

In the embodiment shown in FIG. 6, Au and Pt layers 18 and 20 are applied as thin films over the tungsten layer on the completed structure shown in FIG. 1; either Pt or Au can be the top layer. The result is a three-layer circuit on the AlN substrate 4. The assembly is then thermally reacted to form a two-layer circuit, having a configuration similar to that shown in FIG. 3, with the lower layer comprising tungsten and the top layer an Au—Pt alloy circuit having a composition determined by the relative thicknesses of the Au and Pt layers.

In a demonstration, a 1000 angstrom tungsten layer was sputter deposited onto the AlN substrate, followed by 100 angstrom Au and 1000 angstrom Pt sputter deposited layers. Thermal reaction to form the Au—Pt alloy ACL was accomplished in the course of electrode preparation as described in connection with FIG. 1.

Figure 7:
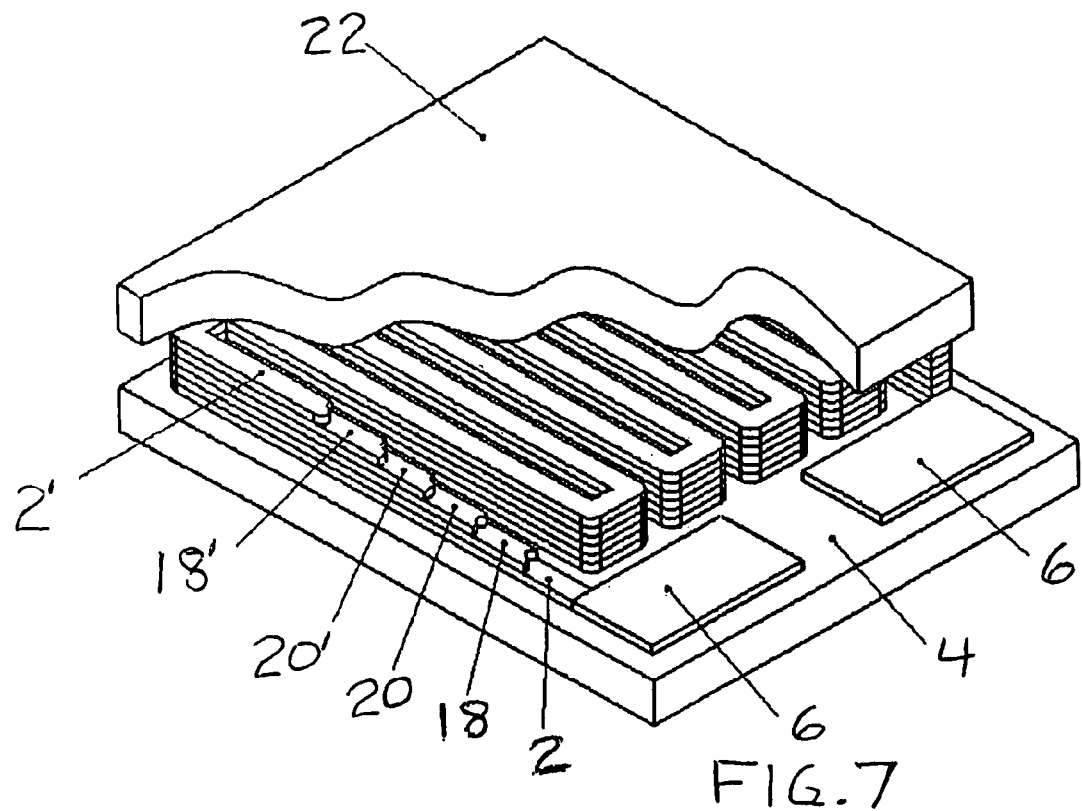
FIG. 7 is a cut-away perspective view of another embodiment, with a pair of structures as illustrated in FIG. 6 assembled together.
Figure 8:
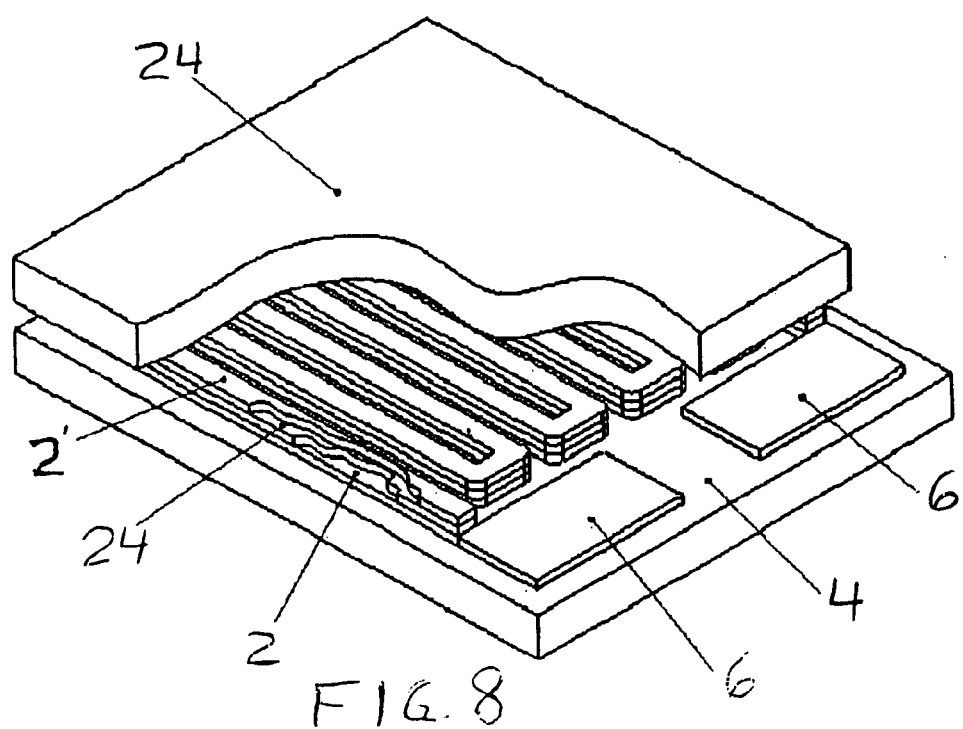
FIG. 8 is a cut-away perspective view of a structure formed by thermally reacting the structure of FIG. 12.

Another embodiment with both an ACL and a protective AlN cap is illustrated in FIGS. 7 and 8. Referring first to FIG. 7, a substrate assembly is provided as in FIG. 6, with Au and Pt layers 18 and 20 (not necessarily in that order) over tungsten layer 2 on substrate 4. An AlN cap 22 is provided with a similar three-layer conductor structure, consisting of tungsten layer 2', with Au and Pt (or Pt and Au) layers 18' and 20', all with the same geometry as the layers on substrate 4. The cap 22 is positioned over substrate 4 with the various layers in alignment. The assembly is then thermally reacted to form a three-layer circuit as shown in FIG. 8, with tungsten layers 2 and 2' adjacent the substrate 4 and cap 24, respectively, and sandwiching a Au—Pt alloy circuit layer 24. In a demonstration, a 100 angstrom thick layer of Au and 1000 angstrom thick layer of Pt were sputter deposited on a 1000 angstrom sputter deposited tungsten layer.

Figure 9:
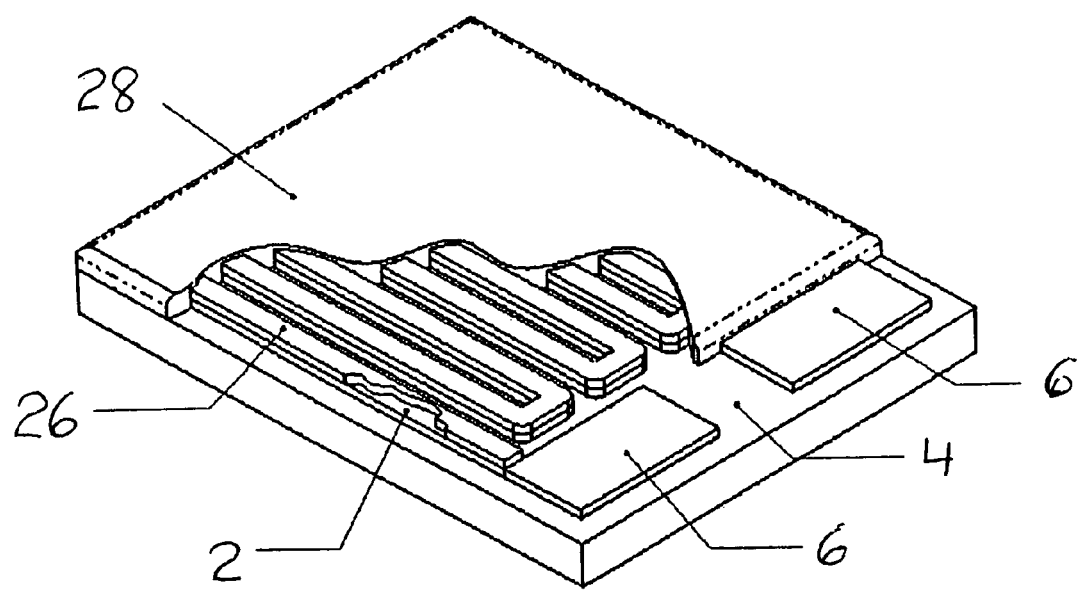
FIG. 9 is a cut-away perspective view of another embodiment, in which a protective encapsulation is formed over the structure of FIG. 6, after that structure has been thermally reacted.

FIG. 9 illustrates the structure resulting from thermal reaction of the structure shown in FIG. 6, with an Au—Pt alloy circuit layer 26 on the tungsten circuit layer 2. A borosilicate encapsulation 28 has been formed over the structure in a manner similar to the encapsulation 14 of FIG. 4.

Figure 10:
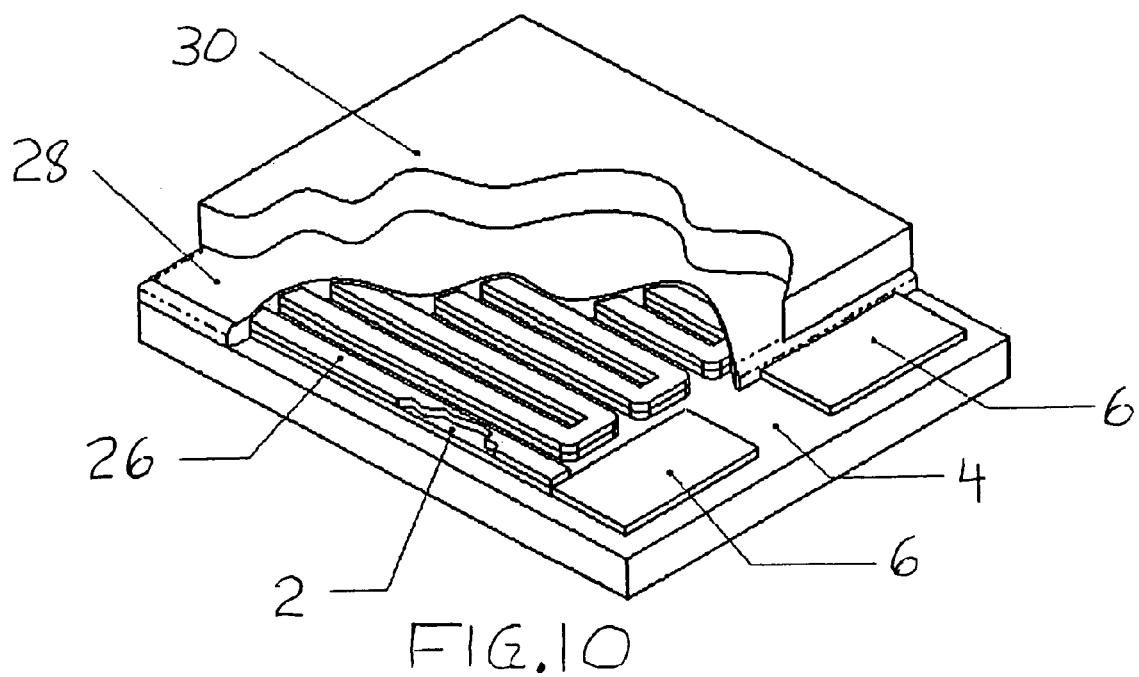
FIG. 10 is a cut-away perspective view of the structure shown in FIG. 9 with an AlN cap.

FIG. 10 illustrates an embodiment in which the structure of FIG. 9 is further protected by an AlN cap 30. With the cap in place, the borosilicate was reacted in air at 1000° C. for 5 minutes to bond on the cap.

Figures 11, 12, 13:
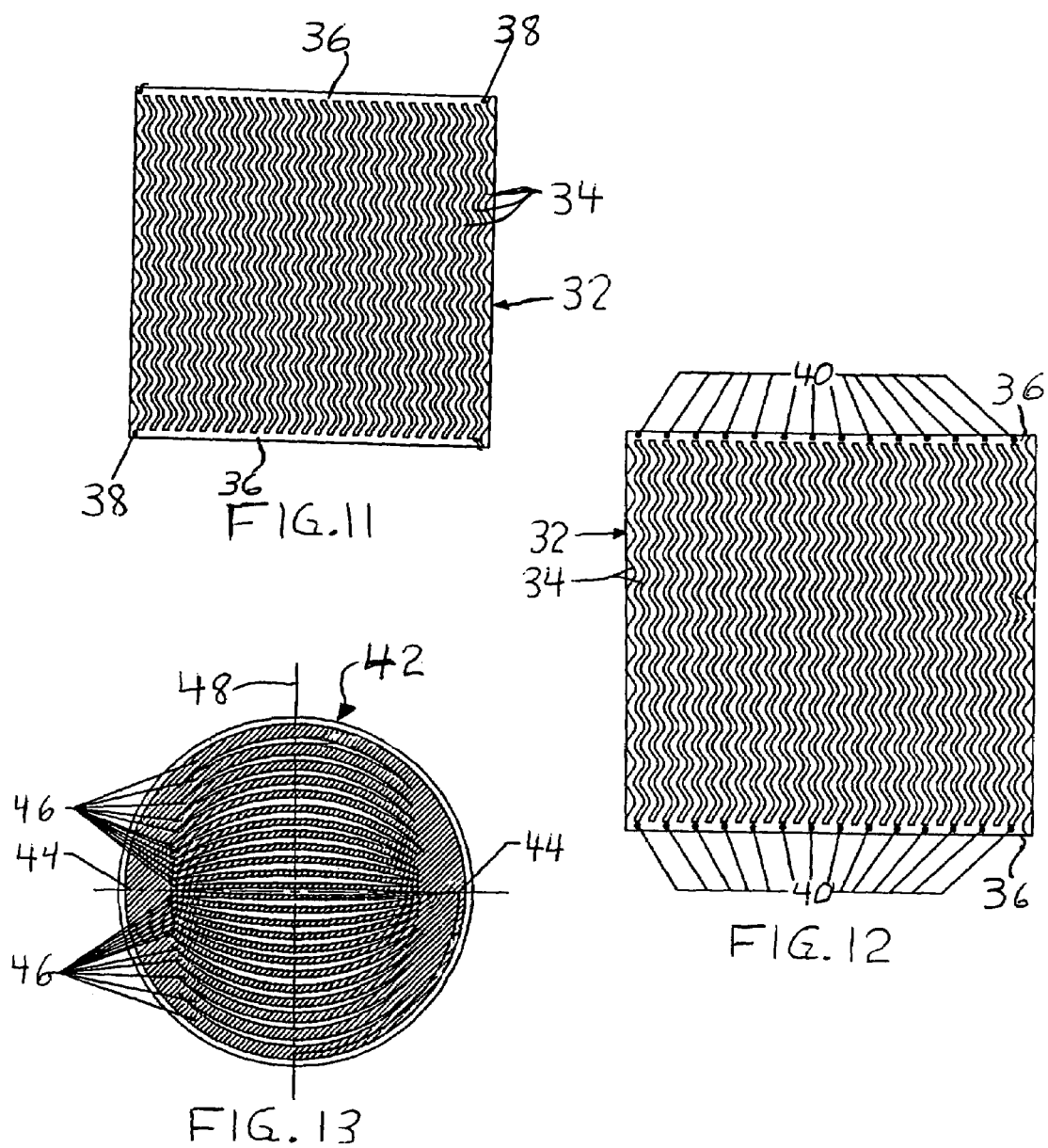
FIGS. 11 and 12 are plan views illustrating a rectangular planar heater in accordance with an embodiment of the invention, with two different electrode configurations.
FIG. 13 is a plan view illustrating a circular planar heater embodiment.

The invention can be advantageously used for a planar heater. FIG. 11 illustrates such a heater formed on a rectangular (including square) AlN substrate 32, which serves as a base for a tungsten heating element that can be fabricated as described above, without ACLs. The tungsten layer is preferably formed as a series of generally parallel, serpentine-shaped strands 34 that are connected in parallel at opposite ends of the substrate by terminal strips 36, with electrodes 38 preferably provided at opposite corners of the array.

The serpentine shape provides uniform heat-up over the entire AlN substrate area (except for its edges), and causes power dissipation to occur more uniformly during rapid thermal ramping. This allows the temperature to be ramped up very rapidly, at rates in excess of 500° C./second, without thermally shocking the substrate. If the circuit strands were straight, initial heating would occur most rapidly at the center of each strand and at the 180° turns at their ends, placing the substrate in danger of breakage due to thermal gradients parallel to its surface when heat is ramped very rapidly.

For a thin (0.01 inch to 0.014 inch (0.025 cm-0.036 cm) thickness), low mass AlN substrate, the width of the strands 34 should not exceed 0.1 inch (0.25 cm) and the spacing between strands should be uniform and not in excess of 0.07 inch (0.18 cm), to ensure that thermal gradients across the spacing between strands will not result in substrate breakage.

The distance between the peak and valley of a serpentine strand, perpendicular to the strand conduction path, must exceed the width of the strand itself. The strands should be curved, without sharp corners. The distance between the strand peaks and valleys parallel to the strand conduction path should not be more than 1 inch (2.5 cm) to prevent substrate cracking during rapid heating, with shorter distances providing more uniform heating over the substrate surface during rapid heat-up.

The combined resistance of the strands is the resistance of a single strand, divided by the total number of strands in the pattern, plus the resistance of one electrode strip. Parallel conducting strands permits rapid heating to high temperatures, with moderate voltages, with thin film strands (100-10,000 angstroms thick).

With the terminal strips 36 provided in FIG. 11, the tungsten strands are parallel not only geometrically, but also electrically. The terminal strips 36 could be replaced with individual electrodes at the opposite ends of each strand, but this would not be as desirable. Locating the electrodes 38 at opposite corners of the substrate keeps any variations in the voltage drop across different strands to a low level.

In an alternate embodiment illustrated in FIG. 12, multiple lead wire terminals 40 are provided on each electrode strip 36 at positions exactly opposite to each other, relative to the strands they service, with each electrode servicing no more than two strands.

FIG. 13 illustrates a preferred tungsten strand pattern for a circular substrate 42 that ensures the electric field intensity between oppositely positioned electrodes 44 does not exceed the dielectric breakdown strength of the AlN substrate at elevated temperatures; exceeding the dielectric breakdown strength can cause the substrate to crack or break. The dielectric strength of the AlN substrate decreases with increasing temperature, and is projected to be about 2000 volts/inch (787 volts/cm) at 1300° C.

The tungsten strands 46 are curved and extend generally along respective lines of longitude that merge at opposite poles which comprise the electrodes 44. The strands are symmetrical about the center line 48 through the polar electrodes. To ensure that power is dissipated uniformly along the length of each strand, the strand widths perpendicular to their conduction paths should be constant, although the strands can overlap as they eminate from an electrode.

Since strands at different distances from the center line 48 will have different lengths, the width of each strand relative to the other strands should progressively decrease towards the center line so that the power dissipation per unit length of each strand is close to the power dissipation per unit length of the other strands. This ensures that the AlN substrate will be uniformly heated and will not break due to thermal gradients. To ensure that thermal gradients between strands perpendicular to the strand path will not cause a thin, low mass AlN substrate to break, the maximum separation between the mid point of the strands should not exceed 0.07 inch (0.18 cm). The separation distance between strands does not have to be identical, but should be symmetrical about the center line 48. For heater temperatures greater than 1300° C., the separation between strand midpoints may need to be less than 0.07 inch (0.18 cm).

Figure 14:
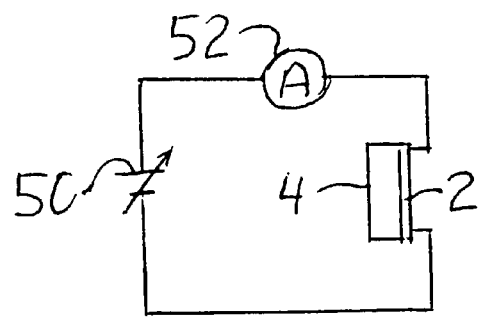
FIGS. 14 and 15 are simplified schematic diagrams illustrating two heater/temperature sensor embodiments of the invention, with voltage and current drives, respectively.
Figure 15:
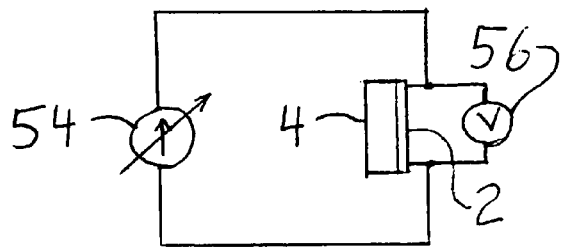

FIGS. 14 and 15 illustrate the application of the invention to a temperature sensor, a single-ended heater, or a heater capable of sensing its own temperature.

In FIG. 14 a voltage source 50 applies a voltage across a tungsten conductive film 2 that is deposited on an AlN substrate 4, as in FIG. 1. An ammeter 52 monitors the current through the tungsten film. When used to sense the temperature of the surrounding environment, a low voltage source is used to apply an actuating signal that does not significantly heat the tungsten film. The film's resistance is thus determined by the temperature of its surrounding environment, in accordance with the known temperature coefficient of resistance for tungsten. The film's resistance, and thus the temperature of the surrounding environment, can be determined by dividing the applied voltage by the measured current. The response of the tungsten film to a known applied voltage, sensed by the ammeter 52, varies with the surrounding temperature. The level of current that can be sustained in the tungsten film without causing the film to heat significantly depends upon several factors, such as the ambient temperature, the film's thickness, surface area and shape, and the heat capacity of the environment. In general, once a heating threshold is reached the film will experience rapid increases in heating with continued increases in the current level. The heating threshold increases as the temperature of the surrounding environment goes up.

When used as an open-ended heater, a higher voltage level is applied. The system can be calibrated in advance to at least approximate the amount of heating that will result from a given applied voltage level, and the ammeter 52 is not needed.

To operate as a heater capable of sensing its own temperature, ammeter 52 is added back to the circuit to sense the current through the tungsten film. The film's temperature can be precisely determined by using the voltage and current levels and the film's known geometry to determine the temperature from the tungsten temperature-resistance curve at which the unit is operating.

The system of FIG. 15 is similar to that of FIG. 14, but instead of applying a voltage across the tungsten film and sensing the resulting current, a current source 54 drives an actuating current through the film 2, and a voltmeter 56 senses the resulting voltage across the film. The film temperature can again be determined in the same manner as for FIG. 14.

Figure 16:
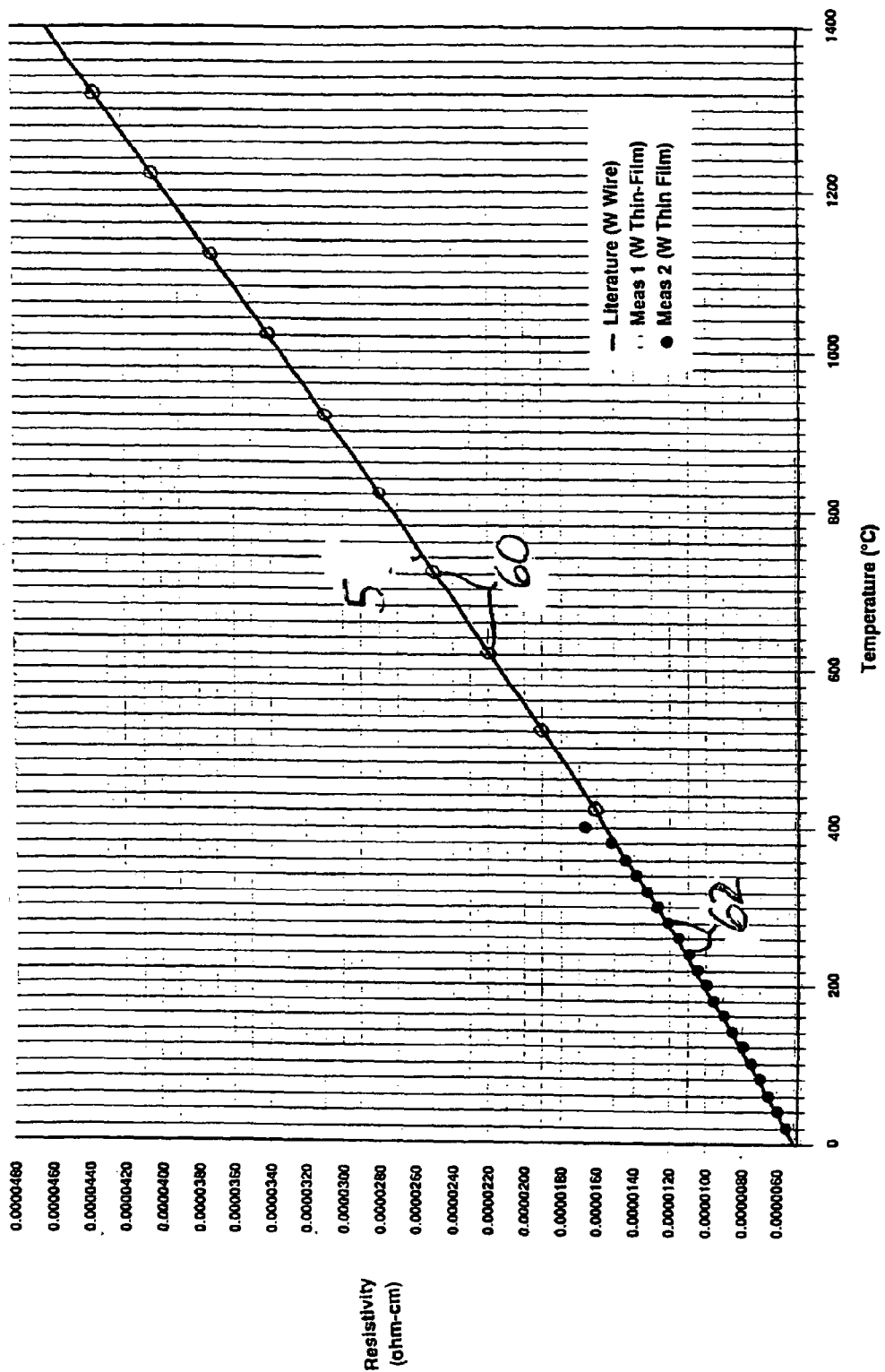
FIG. 16 is a graph contrasting theoretical and measured resistivity v. temperature characteristics for the structure shown in FIG. 1.

The temperature-resistance characteristics of a structure as shown in FIG. 1 were measured and compared with the known theoretical resistance-temperature curve 58 for tungsten shown in FIG. 16. Measurements taken in a flowing Ar environment are indicated by open circles 60, and track the theoretical curve very closely up to the measurement limit of 1400° C. Measurements taken in air tracked the theoretical curve up to a temperature of approximately 260° C., above which they began to diverge away from the theoretical curve due to oxidation of the tungsten. Measurements taken in an air environment are indicated by filled circle 62.

The Ar testing for FIG. 16 was performed inside a water-cooled fused quartz tube. Prototype sensors were placed on an AlN sheet, which rested upon an RF heated graphite susceptor. One lead wire extended from each of two sensor electrodes, through an O-ring seal, to a precision voltage and current source that was used for constant current input to the sensors, and a multimeter that was used to measure the sensor's output voltage. This is believed to be the first time the resistivity of a tungsten thin film has been measured. The data presented in FIG. 16 can be used to calibrate a tungsten thin film of known cross-section and length for use as a temperature sensor.

Testing in air was performed on the heater chuck of a wire ball bonder, with prototype sensors clamped to the heater chuck surface. The top and sides of the sensors were insulated with silica cotton. Electrical contact to sensor electrodes was made by gold probes, extending from micromanipulators, compressionally connected to sensor electrodes. Two-wire electrical measurements were made with both an applied current and a measured sensor output voltage, and an applied voltage from a curve tracer, with the voltage across and current through the sensors read from the curve trace.

Figure 17:
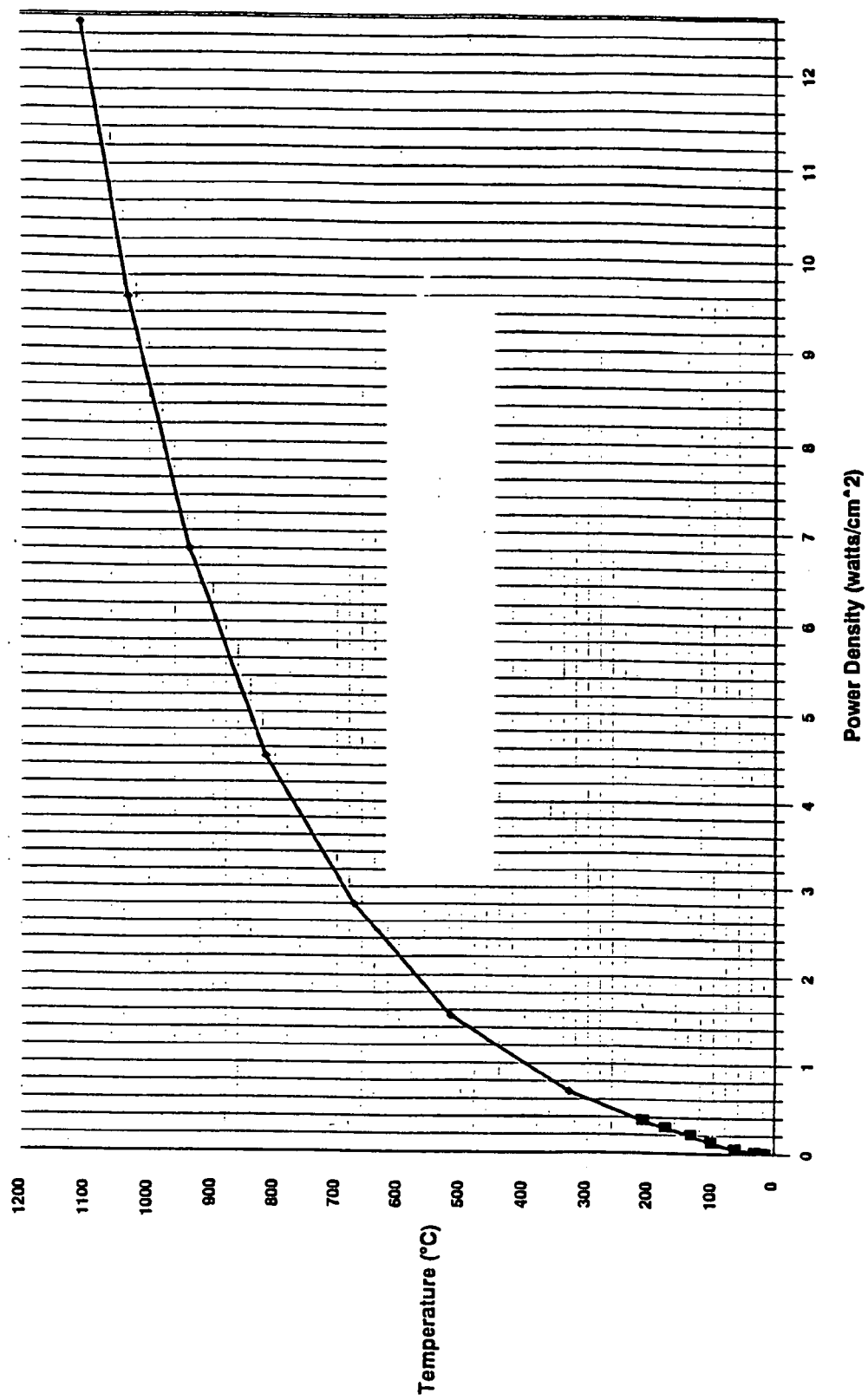
FIGS. 17 and 18 are respectively power per unit substrate area and power per unit substrate volume curves for the embodiment illustrated in FIG. 11, as a function of temperature.
Figure 18:
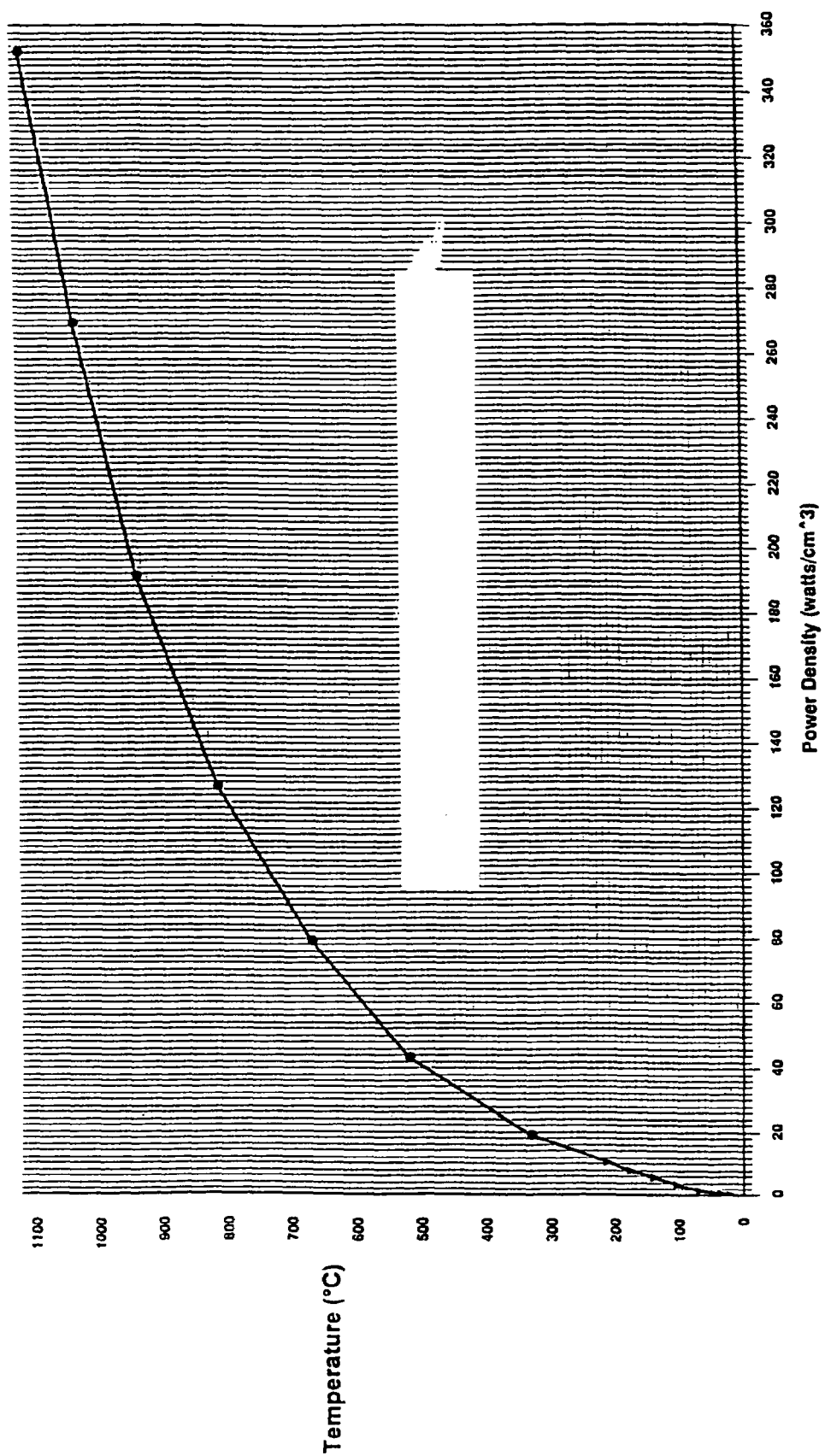

A planar heater of the type shown in FIG. 11 was also tested. Its dimensions were 4.25 in.×4.25 in.×0.014 in. thick (10.8 cm×10.8 cm×0.036 cm). The maximum heating rate obtained was about 500° C. and the maximum temperature was about 1500° C.; both were limited by the available power. The detected power per unit AlN substrate area is presented in the area power density vs. temperature curve of FIG. 17, while the power per unit AlN substrate volume obtained (a more fundamental parameter) is presented in the volumetric power density vs. temperature curve of FIG. 18.

Figure 19:
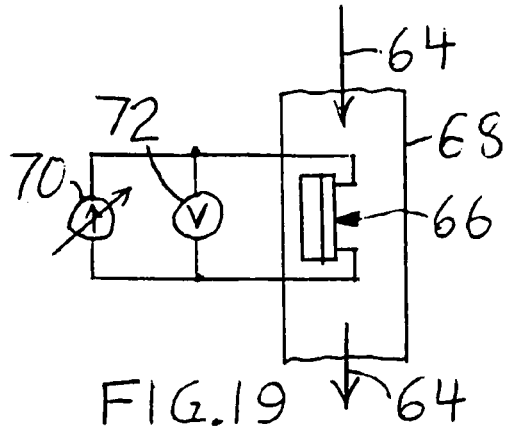
FIGS. 19, 20, 21, 22 and 23 are simplified schematic diagrams illustrating the application of the invention to a single element flow rate sensor, dual element flow rate sensor, fluid level sensor, pressure sensor and environmental sensor, respectively.

The invention can also be used to sense gas and liquid flow rates by measuring the change in temperature of a self-heated sensor that is located along the flow path, either immersed in the fluid or in contact with the flow path wall. In the illustration of FIG. 19, the flow rate of a gas or liquid (indicated by arrow 64) is sensed by measuring the change in temperature of a self-heated sensor 66 of the type described herein that is located along the flow path, either immersed in the flow or in contact with the flow path wall 68. In this and subsequent embodiments described herein the actuating signal is illustrated as being provided by an adjustable current source 70, with a voltmeter 72 sensing the voltage response of the sensor 66, which in turn corresponds to the sensor resistance and thus the fluid temperature. However, a voltage could be provided as the actuating signal and the resulting current sensed. By comparing the sensed temperature to the temperature at zero flow rate, and factoring in the heat capacity of the fluid, the flow rate can be determined.

Figure 20:
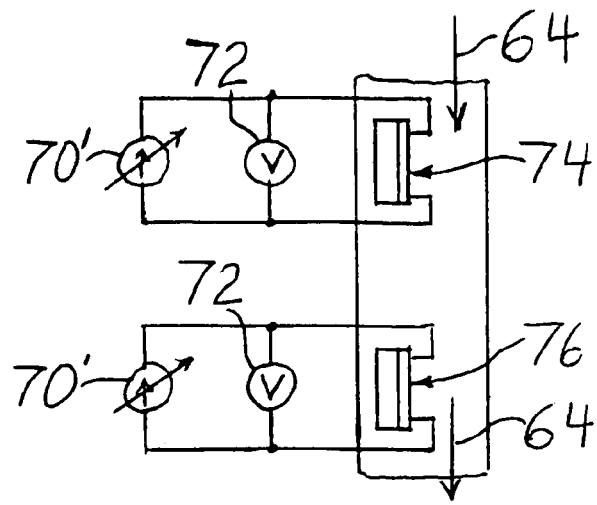

In the differential flow rate sensor illustrated in FIG. 20, two or more sensors 74, 76 of the type described herein are positioned in series along a fluid flow path 64. The flow rate is sensed by measuring the temperature difference between the sensors. At zero flow, the upstream sensor 74 is resistively self-heated by a known current from current source 70' (or a known voltage) to a resistance that represents a known temperature. The downstream sensor 76 is biased by a much smaller, non-self-heating current or voltage. The actuating currents can be supplied from a common current source, or equivalently from a pair of separate current sources 70' as shown. The fluid flow removes heat from the upstream, self-heated sensor 74 and releases some of that heat to the downstream sensor 76. The change in voltage across each of the sensors is related, through the heat capacity of the gas or liquid, to the flow rate. This type of differential flow rate sensing can be used in a conduit that is parallel to the main fluid flow path to determine the flow rate through that path.

Figure 21:
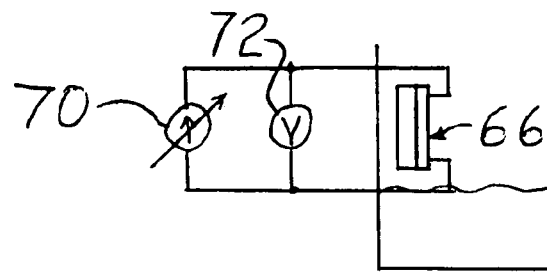

FIG. 21 illustrates an application of the invention to a fluid level sensor, with a sensing element 66 in accordance with the invention disposed at a fixed location within, or in contact with the outer wall of, a liquid reservoir 78. A liquid 80 within the reservoir rises and falls, causing the sensor 66 to be alternately immersed in and cleared from the liquid 80. The heat capacity of the environment in the immediate vicinity of the sensor varies, depending upon whether or not the liquid level has risen sufficiently to immerse the sensor. With the sensor at a known level in the reservoir and employed as a self-heating temperature sensor as described above, a determination of whether or not the sensor is immersed in the liquid can be made by sensing how rapidly heat is withdrawn from the sensor. While this application has been described in terms of a liquid sensor, it can also be used to detect the presence or absence of a gas within a closed reservoir, at least above a minimum density level.

Primary advantages of the invention when applied to the flow rate or fluid level sensing applications described above are a faster response time (related to the high substrate thermal conductivity), greater sensitivity (also related to the high substrate thermal conductivity), and relatively low or no drift (related to the small expansion coefficient mismatch between the W sensing circuit and the AlN substrate).

Figure 22:
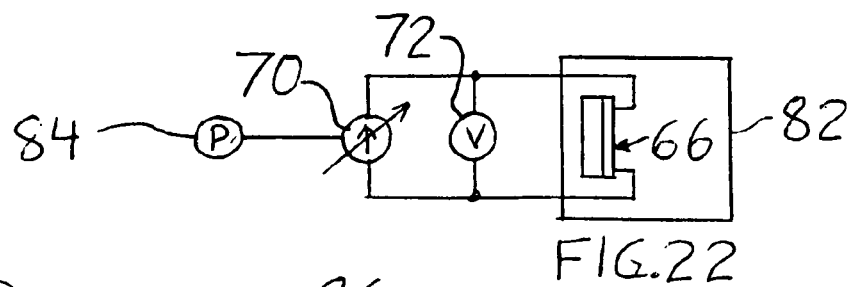

In FIG. 22 the sensor 66 of the present invention is used to sense the gas pressure within a closed reservoir 82. The pressure within the reservoir can be sensed by determining the current required to maintain a specified voltage across the sensor, or the voltage required to maintain a specified current to the sensor. This data can be related to the pressure/density of a gas with a known heat capacity within the reservoir, which can be a vacuum chamber. The current source 70 shown in FIG. 22 is adjusted to maintain a specified voltage level across the sensor, as sensed by voltmeter 72. The conversion of this current level to a pressure level within the reservoir is illustrated by a pressure gauge 84 supplied by the current source. The present invention enables a more sensitive voltage/current sensing than do presently available thermocouples, and accordingly a more sensitive pressure sensing, and can also operate at higher temperatures than available thermocouples.

Figure 23:
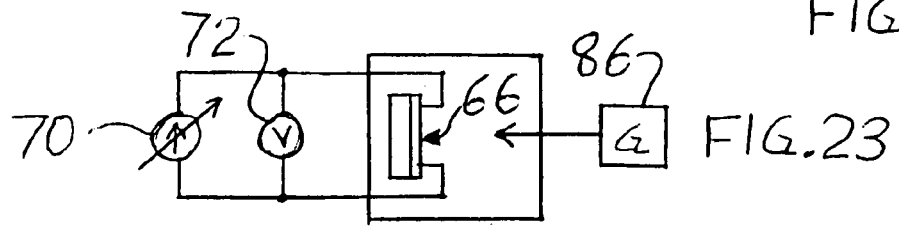

FIG. 23 illustrates the use of the invention to detect the chemical composition of its environment. The sensor 66 has the circuit material exposed to its surroundings, as in FIG. 1, such that all or part of the circuit material can be etched or oxidized by the gas to be sensed. A gas is illustrated as being introduced into the reservoir from a gas tank 86, or it can flow through a flow tube. Any etching or oxidation will reduce the cross-sectional area of the sensing circuit, thus causing its resistance for a known current/voltage level to increase. This increase can be detected by comparing the level of an applied current to the resultant voltage across the sensor, or the level of an applied voltage to the resultant current through the sensor. Applications include manufacturing and research/development of chemicals, pharmaceuticals, cosmetics, plastic and rubber polymers, metals and alloys.

FIGS. 24-26 summarize demonstrated and projected results of various embodiments described above, and compare them to comparable results for prior art sensors and heaters. FIG. 24 summarizes the operational temperature ranges for the embodiments corresponding to the identified figure numbers (the results for FIG. 6 were obtained after thermally annealing the structure). FIG. 25 summarizes advantageous results achieved with temperature sensors corresponding to the identified figure numbers, in comparison to the known characteristics of conventional platinum thin-film RTDs and thermistors.

FIG. 26 summarizes advantageous characteristics and results for planar heaters corresponding to the embodiments of the identified figures, in comparison to the following five types of conventional heaters:

Bulk: a conductive substrate material, generally graphite, ceramic SiC or ceramic BN, in which the substrate functions as the electrical conductor and heater.

Foil: a thin metal conductor, mechanically affixed to a supporting insulator sheet or strip such as Kapton®, mica, glass or other ceramic sheet material.

Rods and Bars: a metallic conductor such as the type used in electric stove tops and toasters.

Planar Heaters: a metallic conductor, applied in a conductor pattern to an insulating substrate (such as AlN, $Al_2O_3$, BN, $Si_3N_4$ or BeO), by screen printing. The substrate is the heater, and receives its heat from the resistively heated circuit metal.

Tungsten Wire: the resistively heated tungsten wire of the type used in light bulbs and tungsten-halogen lamps.

It can be seen from these summaries that the present invention achieves significant improvements in the operating temperature range, precision, and response time for both temperature sensing and heating. Improvements have also been noted in environmental range, sensitivity, lower drift, greater thermal shock resistance, and heating efficiency.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

I claim:

1. A heater comprising:
   an aluminum nitride (AlN) substrate, and
   a plurality of generally parallel and serpentine shaped tungsten conductive strands, said strands deposited as a thin film on said substrate, the shape and spacing of said strands and the thickness of said substrate arranged such that said heater can provide and tolerate a rapid heating rate without damaging said substrate.

2. The heater of claim 1, wherein the widths of said strands are not more than 0.25 cm.

3. The heater of claim 2, wherein the spacing between said strands is not more than 0.18 cm.

4. The heater of claim 3, wherein each of said strands provides a conduction path, said serpentine shape comprising a repeating pattern of a curved peak followed by a curved valley, wherein the peak-to-valley distance of the strands perpendicular to the centerline of said strand conduction path is more than the strand width, and the distance between the strand peaks and valleys parallel to the strand conduction path is not more than 2.5 cm.

5. The heater of claim 1, wherein said substrate is rectangular.

6. The heater of claim 1, wherein the thickness of said substrate is not more than 0.036 cm.

7. The heater of claim 6, wherein the thickness of said substrate is within the range of 0.025-0.036 cm.

8. The heater of claim 1, further comprising a signal source adapted to apply an electrical actuating signal to heat said strands, and
   a sensor adapted to sense the response of said strands to said actuating signal as an indication of the temperature of said strands, said strands having a response to said actuating signal which varies with their temperature.

9. The heater of claim 8, said substrate and strands disposed in a fluid flow path, said signal source being controllable to apply an actuating signal which heats said strands, with said response sensed by said sensor corresponding to a fluid flow rate along said path.

10. The heater of claim 8, wherein said substrate and strands are disposed in a variable pressure environment, said sensor sensing the response of said strands as an indication of the pressure in said environment.

11. The heater of claim 8, wherein said substrate and strands are disposed in an environment in which the strands are subject to alteration from said environment which changes their response to a given actuating signal, wherein the relationship between said actuating signal and said response is indicative of the chemical nature of said environment.

12. The heater of claim 1, wherein
   said plurality of generally parallel and serpentine shaped tungsten conductive strands, over a predetermined temperature operating range, have an expansion coefficient within 1.00+/−0.07 of said substrate, are substantially non-reactive with said substrate, and exhibit substantially no solid-solubility or interdiffusivity with said substrate.

13. The heater of claim 1, wherein the shape and spacing of said strands and the thickness of said substrate are arranged such that said heater can provide a heating rate of >100° C./second without damaging said substrate.

14. The heater of claim 1, wherein the shape and spacing of said strands and the thickness of said substrate are arranged such that said heater can provide a heating rate of >500° C./second without damaging said substrate.

15. The heater of claim 1, wherein the thickness of said thin film strands is 100-10,000 Å.

16. A heater comprising:
   an insulative substrate,
   a plurality of generally parallel and serpentine shaped tungsten (W) conductive strands on said substrate,
   a signal source adapted to apply an electrical actuating signal to heat said strands,
   a sensor adapted to sense the response of said strands to said actuating signal as an indication of the temperature of said strands, said strands having a response to said actuating signal which varies with their temperature,
   an additional insulative substrate with a W layer thereon, said signal source connected to apply a substantially non-heating electrical signal to said W layer, and a sensor connected to sense a response of said W layer as an indication of its temperature,
   said additional substrate and said W layer disposed downstream of said substrate and strands in a fluid flow path, with the difference in temperature between said W layer and said strands corresponding to the fluid flow rate.

17. A heater comprising:
   an aluminum nitride (AlN) substrate, and
   a plurality of generally parallel and serpentine shaped tungsten conductive strands, said strands deposited as a thin film on said substrate, each of said strands providing a conduction path, said serpentine shape comprising a repeating pattern of a curved peak followed by a curved valley, wherein the peak-to-valley distance of the strands perpendicular to the centerline of said strand conduction path is more than the strand width, and the distance between the strand peaks and valleys parallel to the strand conduction path is not more than 2.5 cm,
   the shape and spacing of said strands and the thickness of said substrate arranged such that said heater can provide a heating rate of >100° C./second without damaging said substrate.

18. The heater of claim 17, wherein said substrate is rectangular and said strands are connected together in parallel at opposite ends of said substrate using first and second terminal strips, said heater further comprising first and electrodes contacting respective terminal strips, said electrodes located at opposite corners of said substrate.

19. The heater of claim 17, wherein said substrate is rectangular and said strands are connected together in parallel at opposite ends of said substrate using first and second terminal strips, said heater further comprising a first plurality of lead wires connected to and spaced across said first terminal strip and a second plurality of lead wires connected to and spaced across said second terminal strip such that a voltage can be applied across said strands via said lead wires, said lead wires connected to said first and second terminal strips at positions directly opposite to each other relative to the strands they service, each lead wire servicing no more than two strands.

20. The heater of claim 17, wherein said substrate is circular and said strands extend along respective lines of longitude that merge at opposite poles of said substrate.

21. The heater of claim 20, further comprising electrodes located at each of said poles, said heater arranged such that said strands are symmetrical about the centerline through said poles and the strand widths perpendicular to the centerline of their conduction paths is constant.

22. A heater comprising:

an aluminum nitride (AlN) substrate having a thickness of $\leq 0.036$ cm, and a plurality of generally parallel and serpentine shaped tungsten conductive strands, said strands deposited as a thin film on said substrate such that the width of each strand is not more than 0.25 cm and the spacing between said strands is not more than 0.18 cm, each of said strands providing a conduction path, said serpentine shape comprising a repeating pattern of a curved peak followed by a curved valley, wherein the peak-to-valley distance of the strands perpendicular to the centerline of said strand conduction path is more than the strand width, and the distance between the strand peaks and valleys parallel to the strand conduction path is not more than 2.5 cm, the shape and spacing of said strands and the thickness of said substrate arranged such that said heater can provide a heating rate of >100° C./second without damaging said substrate.

* * * * *